(12) United States Patent
Buluschek

(10) Patent No.: US 6,772,496 B1
(45) Date of Patent: Aug. 10, 2004

(54) METHOD FOR MAKING SIMULTANEOUSLY AT LEAST TWO DRIP IRRIGATION PIPES

(75) Inventor: Bruno Buluschek, Echandens (CH)

(73) Assignee: Swisscab S.A., Yvonand (CH)

(*) Notice: Subject to any disclaimer, the term of this patent is extended or adjusted under 35 U.S.C. 154(b) by 0 days.

(21) Appl. No.: 10/148,453

(22) PCT Filed: Nov. 16, 2000

(86) PCT No.: PCT/EP00/11559

§ 371 (c)(1),
(2), (4) Date: Nov. 8, 2002

(87) PCT Pub. No.: WO01/39592

PCT Pub. Date: Jun. 7, 2001

(30) Foreign Application Priority Data

Nov. 30, 1999 (EP) .............................................. 99123772

(51) Int. Cl.[7] ........................... B23P 17/00; B23P 19/02
(52) U.S. Cl. ............................. 29/414; 29/412; 29/417; 29/426.4
(58) Field of Search .......................... 29/414, 412, 415, 29/416, 426.4, 417; 239/542, 276, 551, 565; 264/171.26; 405/43, 36, 45; 138/170, 177

(56) References Cited

U.S. PATENT DOCUMENTS

| | | | |
|---|---|---|---|
| 4,124,426 A | * 11/1978 | Saul | ........................... 156/193 |
| 4,247,051 A | 1/1981 | Allport | |
| 4,357,250 A | * 11/1982 | Hayashi | ........................ 508/234 |
| 4,430,020 A | 2/1984 | Robbins | |
| 5,106,021 A | 4/1992 | Gilead | |
| 5,163,622 A | 11/1992 | Cohen | |

FOREIGN PATENT DOCUMENTS

| | | |
|---|---|---|
| EP | 070 582 A2 | 1/1983 |
| EP | 129 151 A2 | 12/1984 |
| EP | 642 915 A1 | 3/1995 |

* cited by examiner

Primary Examiner—John C. Hong
(74) Attorney, Agent, or Firm—Sughrue Mion, PLLC

(57) ABSTRACT

The invention concerns a drip irrigation conduits (1) comprising a tube (2) designed to be connected to a pressurised water source. The tube is provided with two lateral lips (3a, 3b) superposed on each other and are formed integral with said tube. The conduit (1) further comprises, at intervals, flow cavities allowing water to trickle through (11) communicating the tube (2) inside with outside environment. The invention is characterised in that a strip (4) is fixed in sealed manner between the lips (3a, 3b), and the cavities. (11) are produced in said strip (4) by stamping said strip (10, 10A) so that they constitute through cavities substantially on either side of a longitudinal plane of symmetry (P) on the strip (10, 10A), each flow cavity (11, 11A) comprising at one first end a feed chamber (13) designed to emerge into one of said conducts and at the other end a discharge chamber (14) designed to emerge outside said one conduit; the stamping process being also designed so that the discharge chambers of the flow cavities located substantially on either side of the plane of symmetry (P) of the strip do not communicate with each other.

13 Claims, 7 Drawing Sheets

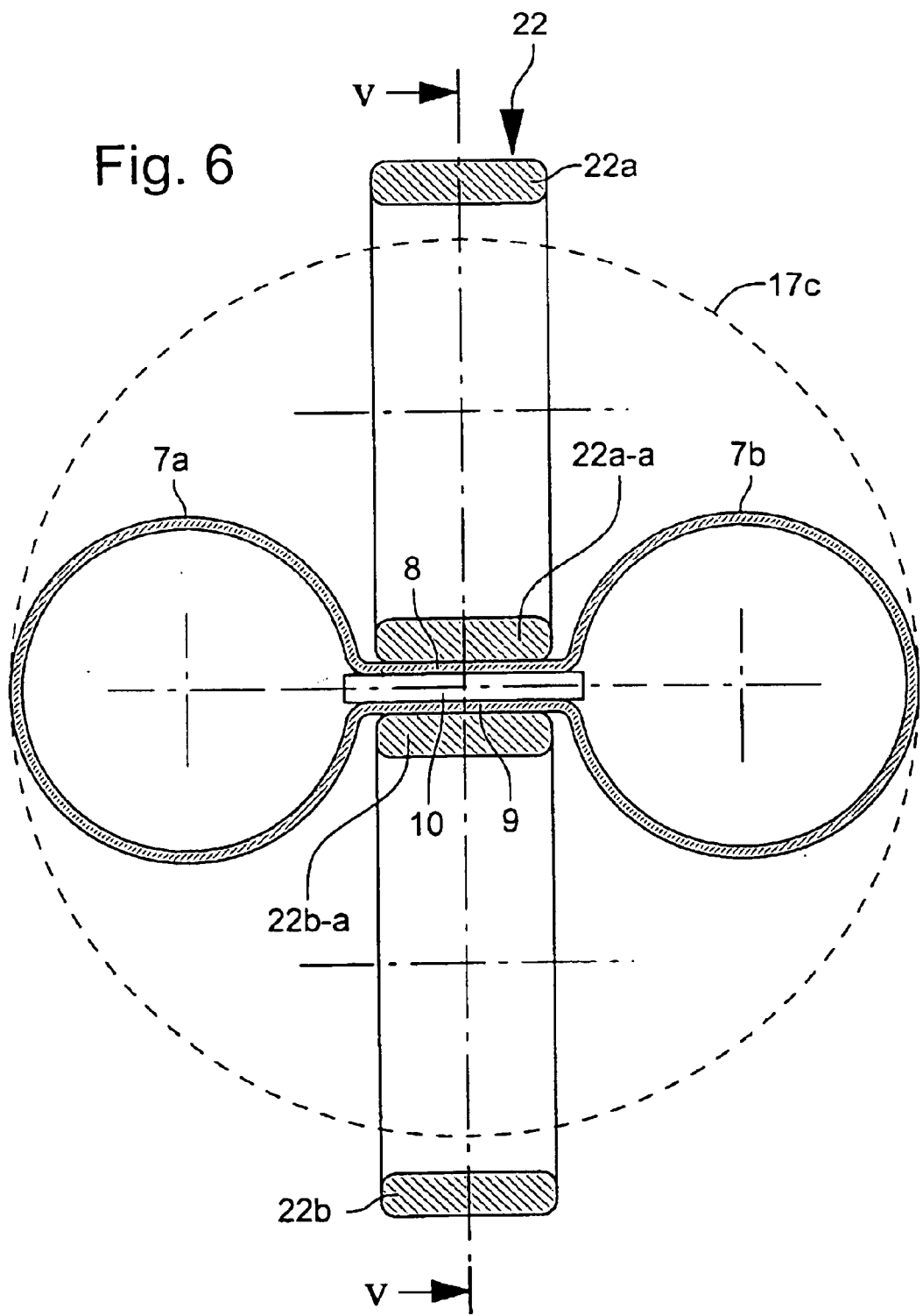

METHOD FOR MAKING SIMULTANEOUSLY AT LEAST TWO DRIP IRRIGATION PIPES

The present invention concerns the field of drip irrigation and more particularly a method for simultaneously manufacturing at least two conduits and an intermediate product allowing such conduits to be obtained.

There is known from U.S. Pat. No. 5,106,021, a drip irrigation conduit made from an elongated sheet of plastic material folded over lengthwise. The two plies are joined by their edges to form two longitudinal lips, which extend adjacent to the tube from which they are formed. When the tube is connected to a pressurised water source, it swells up and then has a cylindrical shape of circular section for example, from which the two lateral lips project.

One or both of the two lips of this conduit are provided with impressions, which form water flow cavities. These cavities have the shape of labyrinths, which, via water feed and discharge chambers, respectively communicate with the inside of the conduit and the exterior. These impressions are typically obtained by embossing or directly printing the plastic material using, for example, a roller including raised shapes on its periphery.

Such a conduit has acceptable flow qualities if the water with which it is fed is of irreproachable purity, for example if it is subjected to careful filtering, which is rarely the case of water used for irrigation. The shape of the labyrinths, whose outlines can only be defined approximately because of the very method via which they are made, does not allow a sufficiently turbulent flow of water, which leads to the labyrinths becoming quickly dirty and sooner or later blocked up.

Another drawback of this type of conduit lies in the fact that, making the labyrinths by embossing or printing does not enable a precise and regular shape to be obtained over the entire length of the labyrinths and their feed and discharge chambers, which is detrimental to the uniformity of the irrigation.

There is also known from U.S. Pat. No. 4,430,020, an irrigation conduit provided with two lips superposed on each other between which a resilient strip is inserted, connected in a watertight manner to said lips. Flow cavities each including a feed chamber in communication with the inside of the conduit and a discharge chamber in communication with the exterior are arranged at intervals in the strip. This document does not, however, describe how to manufacture such an irrigation conduit continuously, or how to manufacture at least two irrigation conduits simultaneously.

There is also known from Patent No. EP 0 642 915, a method for simultaneously manufacturing at least two Irrigation conduits. According to this Patent, two conduits are formed side by side and connected to each other by a junction section including, according to a first embodiment (shown in FIG. 5), a plurality of pre-formed members in the form of a strip fixed inside the junction section at intervals along the longitudinal axis of the conduits. Each pre-formed member includes a pair of flow-reducing cavities, located respectively on either side of the longitudinal axis of the pre-formed member. Each cavity includes a feed chamber and a discharge chamber between which there extends a labyrinth-shaped channel, the discharge chambers of each cavity of a pair communicating with each other. The junction section of the conduits is then slit along the longitudinal axis of the pre-formed members to form two irrigation conduits each including a plurality of flow cavities.

According to the embodiment in question, the cavities are made in the strip by embossing the material of strip to form a impression of determined shape, the impression including in all cases a bottom formed by a portion of the strip. This technique for shaping the cavities does not guarantee satisfactory integrity of the geometry of the cavities and leads to the drawbacks already mentioned with reference to U.S. Pat. No. 5,106,021. The method disclosed in Patent No. EP 0 642 915 does not satisfactorily answer the expectations and requirements of users.

The main object of the invention is to overcome the drawbacks of the prior art by providing a simultaneous manufacturing method for at least two irrigation conduits which can easily be implemented and which ensures economical and continuous manufacture of irrigation conduits able, in particular, to be used with imperfectly filtered water without any risk of clogging.

The invention therefore concerns a method for simultaneously manufacturing at least two irrigation conduits including the steps consisting in:

a) continuously producing at least a strip made of plastic material, b) cutting out by stamping, in said strip through flow cavities, substantially on either side of a longitudinal plane of symmetry of the strip each flow cavity including at a first end a feed chamber intended to open out into one of said conduits and at another end a discharge chamber intended to open out on the exterior of said one conduit the stamping step being also provided so that the discharge chambers of the flow cavities extend substantially on either side of the plane of symmetry of the strip and the discharge chambers of the flow cavities located respectively on either side of the plane of symmetry do not communicate with each other, c) continuously producing a tubular sleeve made of plastic material intended to form said conduits, d) guiding said strip axially inside said sleeve during its production, e) pinching said sleeve in at least a diametral zone to form an elongated two-part body exhibiting symmetry with respect to a longitudinal plane and including two juxtaposed conduits, joined by superposed bands integral with said sleeve, said trip being secured in an impervious manner between the bands, f) bonding said strip to said bands, and g) slitting said two-part body longitudinally along said plane of symmetry.

This method leads to continuous manufacturing of conduits without requiring the use of discrete flow reducing member or dripper units well known in the prior art, such as those described in U.S. Pat. No. 5,163,622, such dripper units requiring manufacturing, handling, guiding, orientation and transport control until they are inside the conduit.

It will be noted especially, that, owing to the implementation of the stamping step, it is possible to obtain flow cavities or labyrinths having very precisely defined geometries, allowing, in particular, turbulence to be created in the water which passes through them causing a self cleaning of the cavities and a limitation of the flow rate. Further, it becomes convenient to give each cavity a significant length, which also contributes to improving the self cleaning properties. Finally, the shape of the cavities is perfectly reproducible so that regular irrigation is obtained over the entire length of the conduit.

Moreover, the fact that the discharge chamber of the cavities located substantially on either side of the plane of symmetry of the strip do not communicate with each other allows the flow channels to keep their geometrical integrity during the entire manufacturing process. Indeed, without this feature, the portion of strip arranged between the channels of each flow cavity would overhang and could move laterally inducing thereby variations in the dimensions and geometry of the channels of the labyrinth which would affect the flow rate and could possibly block the channels.

Other advantageous features of this method are defined in dependent claims 2 to 10.

The invention also concerns an intermediate product obtained according to the invention, said intermediate product being steps a) to f) of claim 1 characterised in that it includes an elongated two-part body exhibiting symmetry with respect to a longitudinal plane and including two juxtaposed conduits joined by superposed bands integral with said sleeve, and a strip fixed in an impervious manner between the bands, in that said strip is provided with through flow cavities, substantially on either side of said longitudinal plane of symmetry of the strip, each flow cavity including at a first end a feed chamber opening out into one of said conduits and at another end a discharge chamber intended to open out to the exterior of said one conduit and in that the discharge chambers of the flow cavities extend substantially on either side of the plane of symmetry of the strip and in that the discharge chambers of the flow cavities located respectively on either side of the plane of symmetry do not communicate with each other.

This intermediate product has the advantage of considerably facilitating the manufacture of irrigation conduits and reducing the cost thereof because of the possibility of manufacturing two conduits simultaneously.

Other features and advantages of the present invention will appear during the following description, given solely by way of example and made with reference to the annexed drawings, in which:

FIG. 6 is a cross-section taken along the line VI—VI of FIG. 5;

Figure 7A:
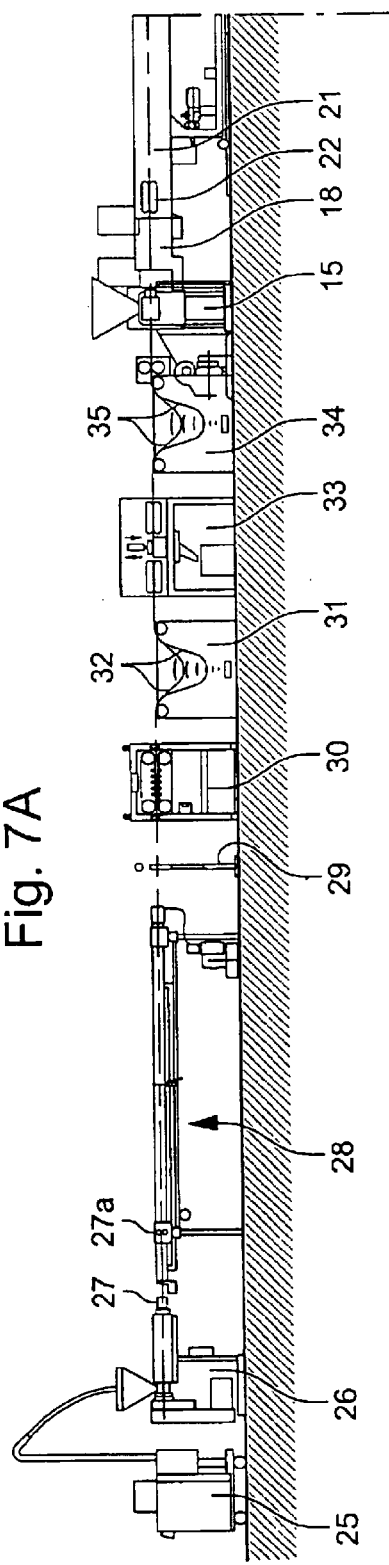
Figure 7B:
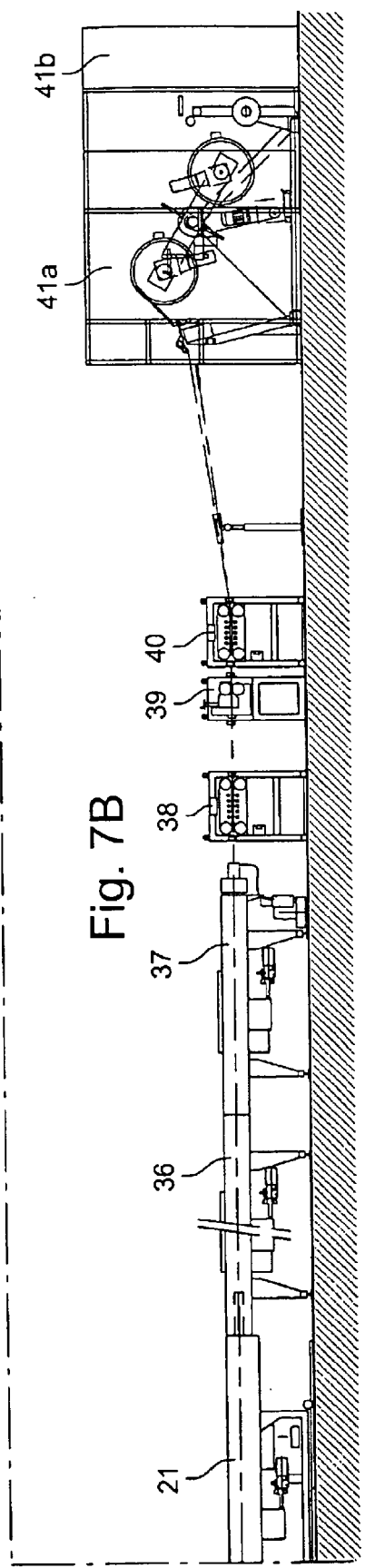
Figure 8A:
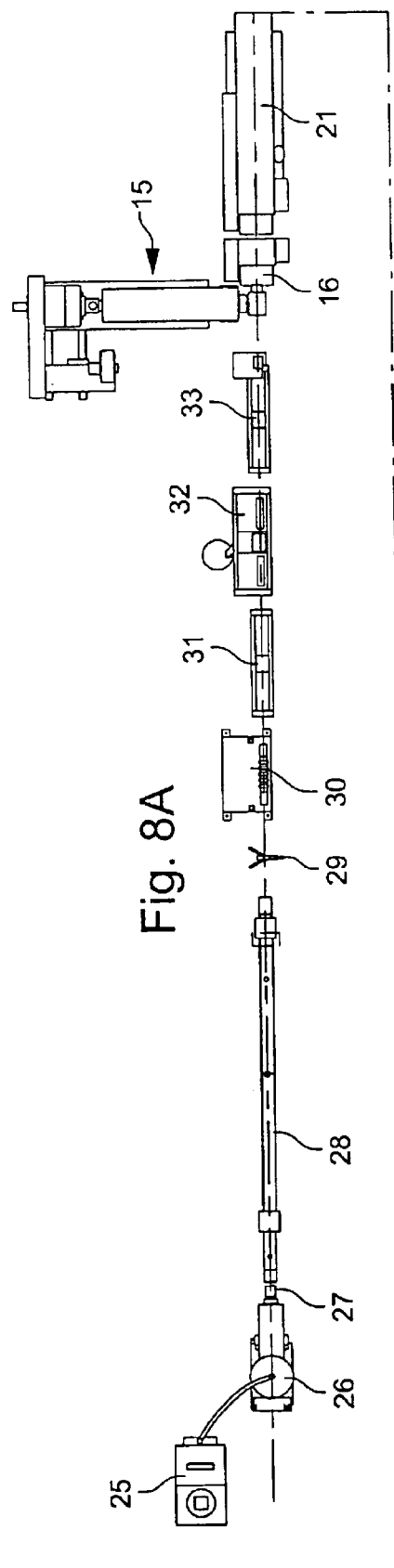
Figure 8B:
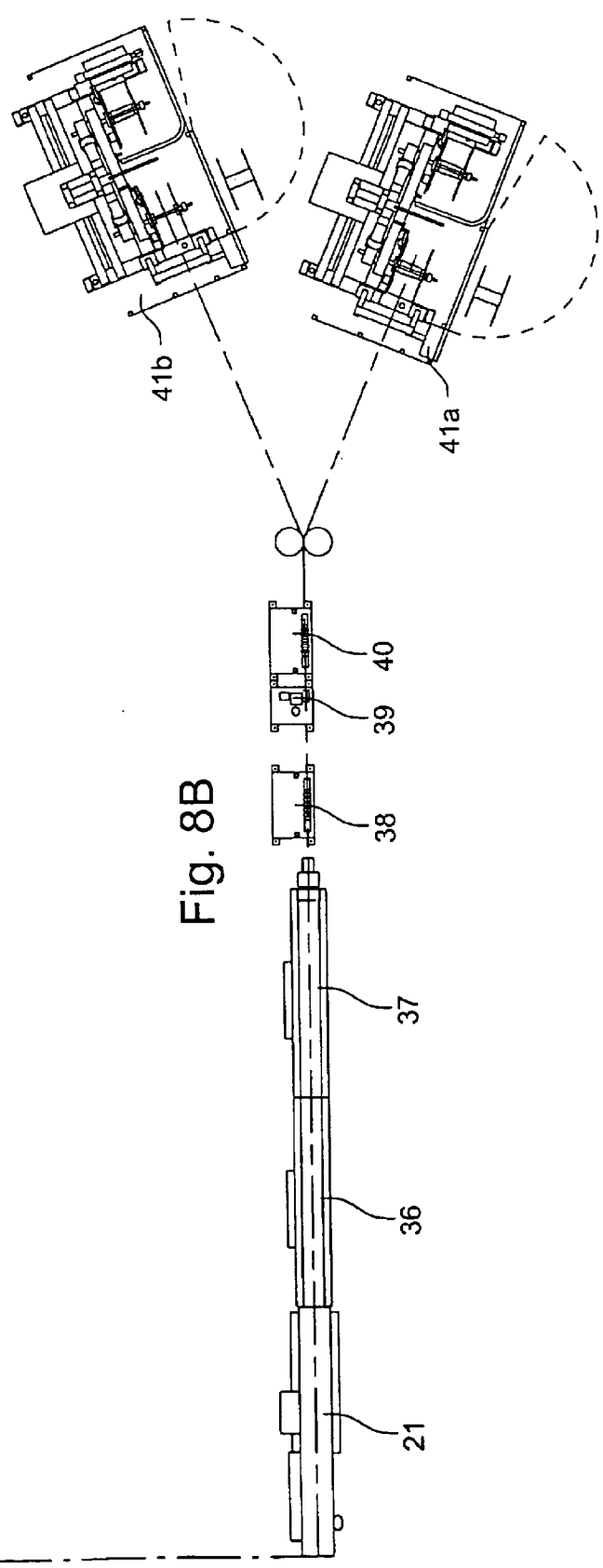
Figure 9A:
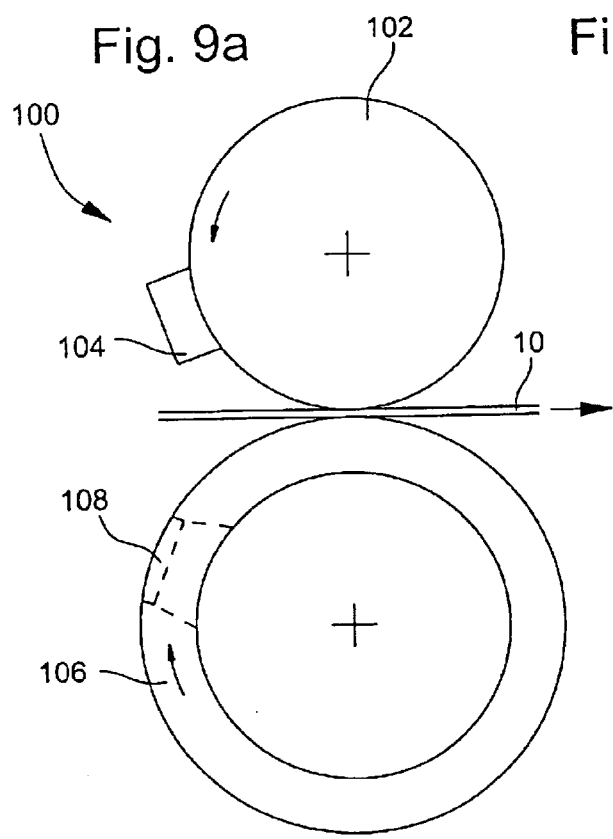
Figure 9B:
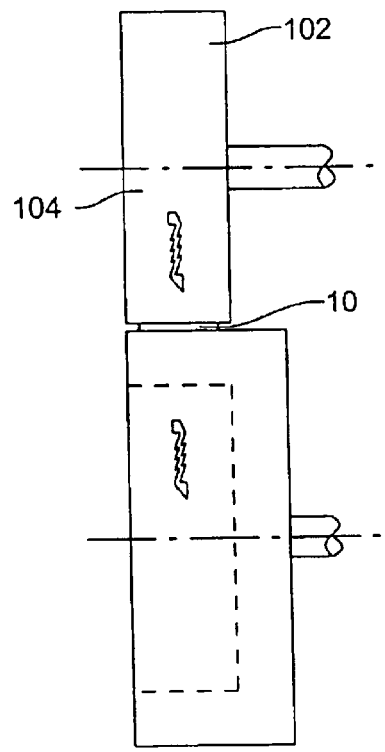
Figure 10A:
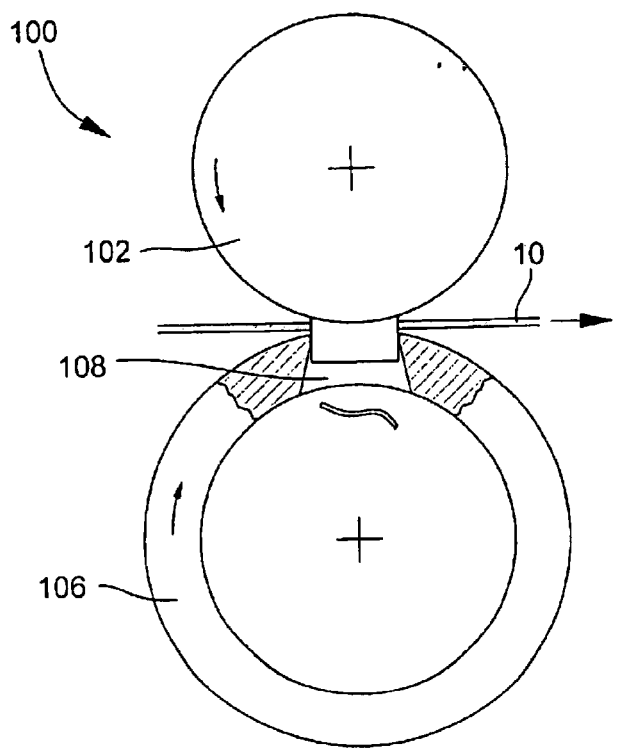
Figure 10B:
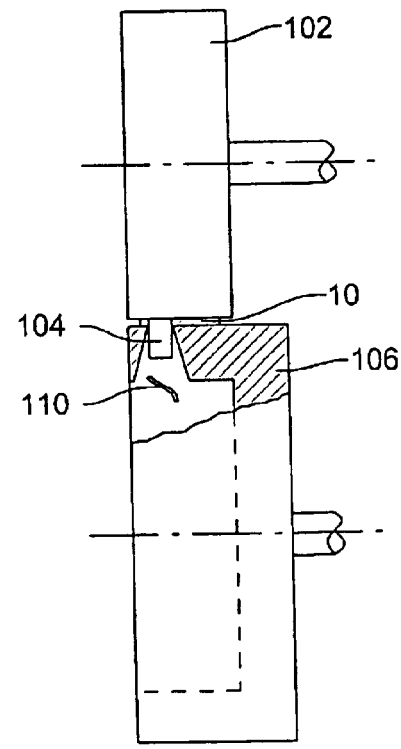

FIGS. 7A and 7B together show a very schematic lateral elevation view of a manufacturing line of irrigation conduits according to the invention;

FIGS. 8A and 8B together show a plane view of this manufacturing line; and

FIGS. 9A, 10A and 9B, 10B respectively show face and side views of an alternative embodiment of the strip slitting station in which the flow cavities are slit.

Figure 1:
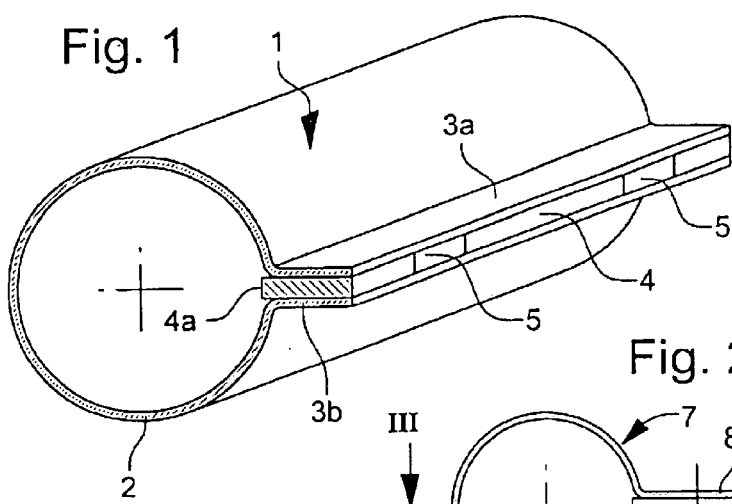
FIG. 1 is a perspective view of a section of drip irrigation conduit according to the invention.

Reference will be made first of all to FIG. 1 which shows the preferred embodiment of the drip irrigation conduit according to the invention, designated by the general reference 1.

This irrigation conduit 1 includes a cylindrical tube 2 preferably of circular section, provided laterally with two superposed longitudinal lips 3a and 3b. These lips are formed respectively by marginal portions of an elongated strip folded over itself to form conduit 1. These lips are thus integral with tube 2 which is made from a suitable plastic material known in this type of irrigation tube technology. It should be noted that as a function of the thickness of the wall of tube 2, the latter can only ensure its circular cylindrical shape when water under pressure flows inside tube 2.

According to the invention, a strip 4 of plastic material which runs across the entire length of conduit 1, is arranged between lips 3a and 3b. The width of this strip is preferably slightly greater than that of lips 3a and 3b, since it is flush with the edges of the lips on the outer side, whereas inside tube 2, it projects from the inner surface of the tube slightly by a small edge 4a.

In FIG. 1, one can also see two lateral apertures 5 through which the water drips or trickles towards the exterior, when water under pressure flows in tube 2, conduit 1 includes a plurality of these orifices 5 regularly distributed along its length.

Figure 2:
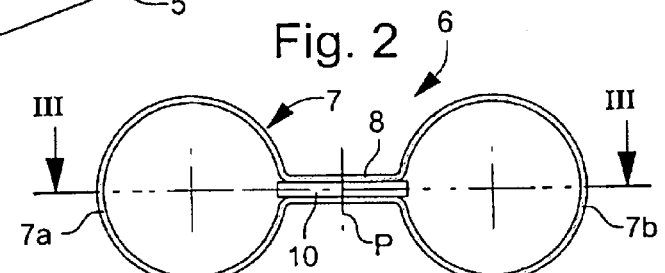
FIG. 2 shows a cross-section of an intermediate product from which two drip irrigation conduits according to the invention can be obtained.
Figure 3:
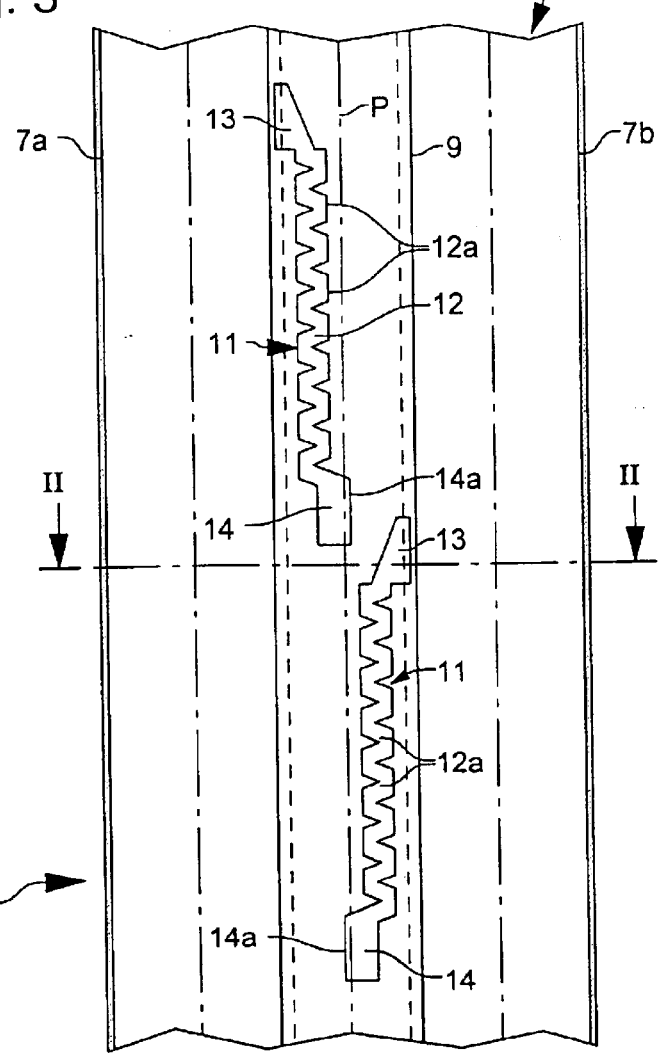
FIG. 3 is a longitudinal cross-section of this intermediate product, taken along the line III—III of FIG. 2.

Reference will now be made to FIGS. 2 and 3 in order to examine an intermediate product, designated by the general reference 6, for obtaining a drip irrigation conduit, as shown in FIG. 1.

This intermediate product 6 includes a two-part body 7 formed of two parallel cylindrical tubes 7a and 7b, joined to each other by two superposed junction bands 8 and 9 integral with tubes 7a and 7b.

A strip 10 made of a plastic material such as polyethylene, is arranged between bands 8 and 9, which it overhangs slightly on either side by projecting respectively into the inner spaces of tubes 7a and 7b by small edges 10a. Thus, the whole of two-part body 7 has a longitudinal plane of symmetry, which will be designated by the reference P.

As can be seen more particularly in FIG. 3 and according to another feature of the invention, strip 10 is provided with a plurality of cavities 11 regularly distributed across its entire length, these cavities allowing the water flow rate to be limited. These cavities 11 are made in strip 10 by stamping using a suitable tool. The cavities thus extend across the entire thickness of strip 10. When the strip is not arranged between bands 8 and 9, cavities 11 form through openings from one large face of the strip to another.

Each flow cavity 11 has the shape of an elongated labyrinth 12 including a plurality of juxtaposed V-shaped meanders 12a. Cavities 11 communicate, via a first end, with a water feed chamber 13 which opens out into the respective tube 7a or 7b and, via another end, into a water discharge chamber 14, which is still blocked in intermediate product 6.

In the intermediate product embodiment shown, cavities 11 are alternately arranged on either side of plane of symmetry P and they are distanced from each other longitudinally. Moreover, it can be seen in FIG. 3, that discharge chambers 14 of each flow cavity 11 slightly pass beyond plane P in the direction of the edge opposite strip 10 to form a divisible volume 14a, i.e. which can be divided.

Figure 4:
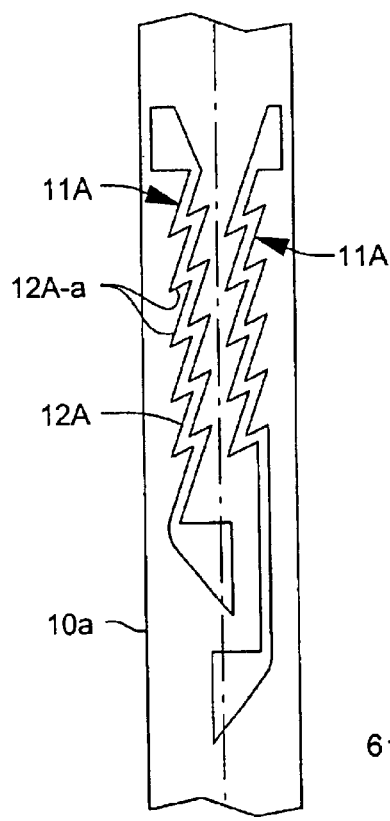
FIG. 4 shows a partial view of an alternative embodiment of an irrigation conduit according to the invention.

It will be noted however, that this arrangement of flow cavities 11 is not the only possible arrangement within the scope of the invention. Thus, FIG. 4 shows another example in which there is used a strip 10A having water flow cavities 11A, which are located on either side of plane of symmetry P, but arranged respectively facing each other, i.e. in lateral juxtaposition, on either side of said plane of symmetry P. It will also be noted that, in this case, meanders 12A of labyrinths 12A have a zigzag shape with acute angles at the connections between the portions of each meander.

It will thus be understood that intermediate product 6 of FIGS. 2 and 3, or the variant made in accordance with FIG.

4, allows two conduits to be obtained, such as conduit 1 of FIG. 1, by dividing product 6 along longitudinal plane of symmetry P, thereby separating volumes 14a from water flow cavities 11 or 11A such that discharge chambers 14 open out towards the exterior of each conduit thereby obtained, via an orifice like orifice 5 of FIG. 1.

Figure 4A:
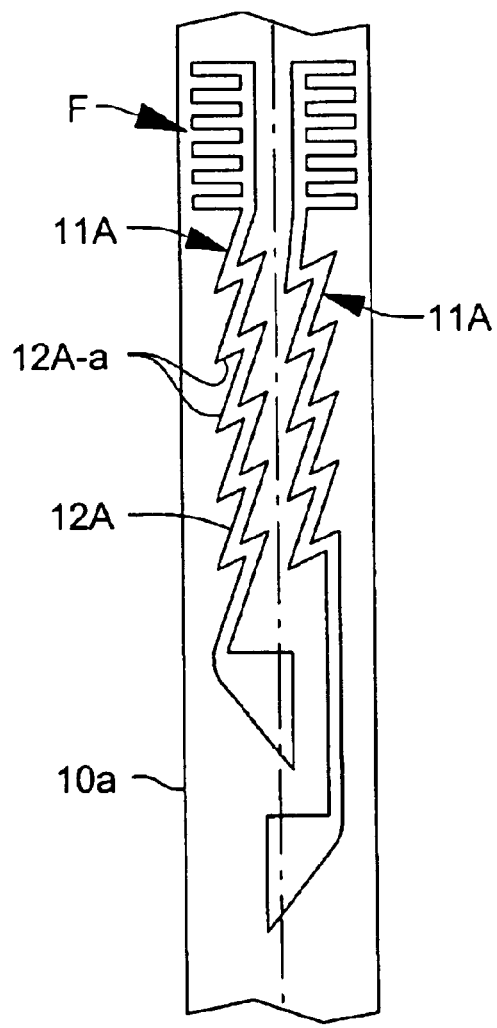
FIGS. 3a and 4a are similar views to FIGS. 3 and 4 illustrating an alternative embodiment of the flow cavity of the conduit according to the invention.
Figure 3A:
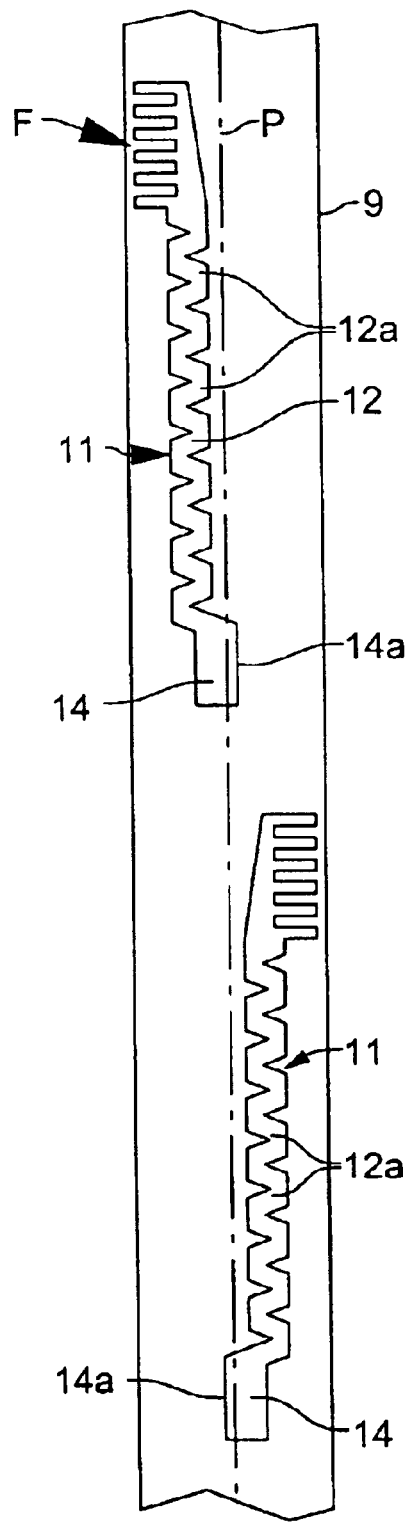

With reference to FIGS. 3a and 4a, one can see similar views to FIGS. 3 and 4, but which illustrate an alternative embodiment of flow cavity 11 of the conduit according to the invention. These flow cavities 11 differ from those described, in particular, with reference to FIGS. 3 and 4, in that water feed chamber 13 is defined by a particular comb-like cutting. Once the strip is inserted between bands 8 and 9, such cutting allows a plurality of feed orifices to be formed for each chamber 13. The number and size of these orifices are respectively defined by the number and the spaces between the teeth of the comb. It is thus clear that this particular cutting shape of the flow cavity can, simply and inexpensively, form filtering means F for the liquid which enters flow cavities 11. This arrangement reduces still further the risk of dirt accumulating in the cavities. By way of indication, the width of these orifices is of the order of 0.5 mm and the height depends on the width of the strip.

Figure 5:
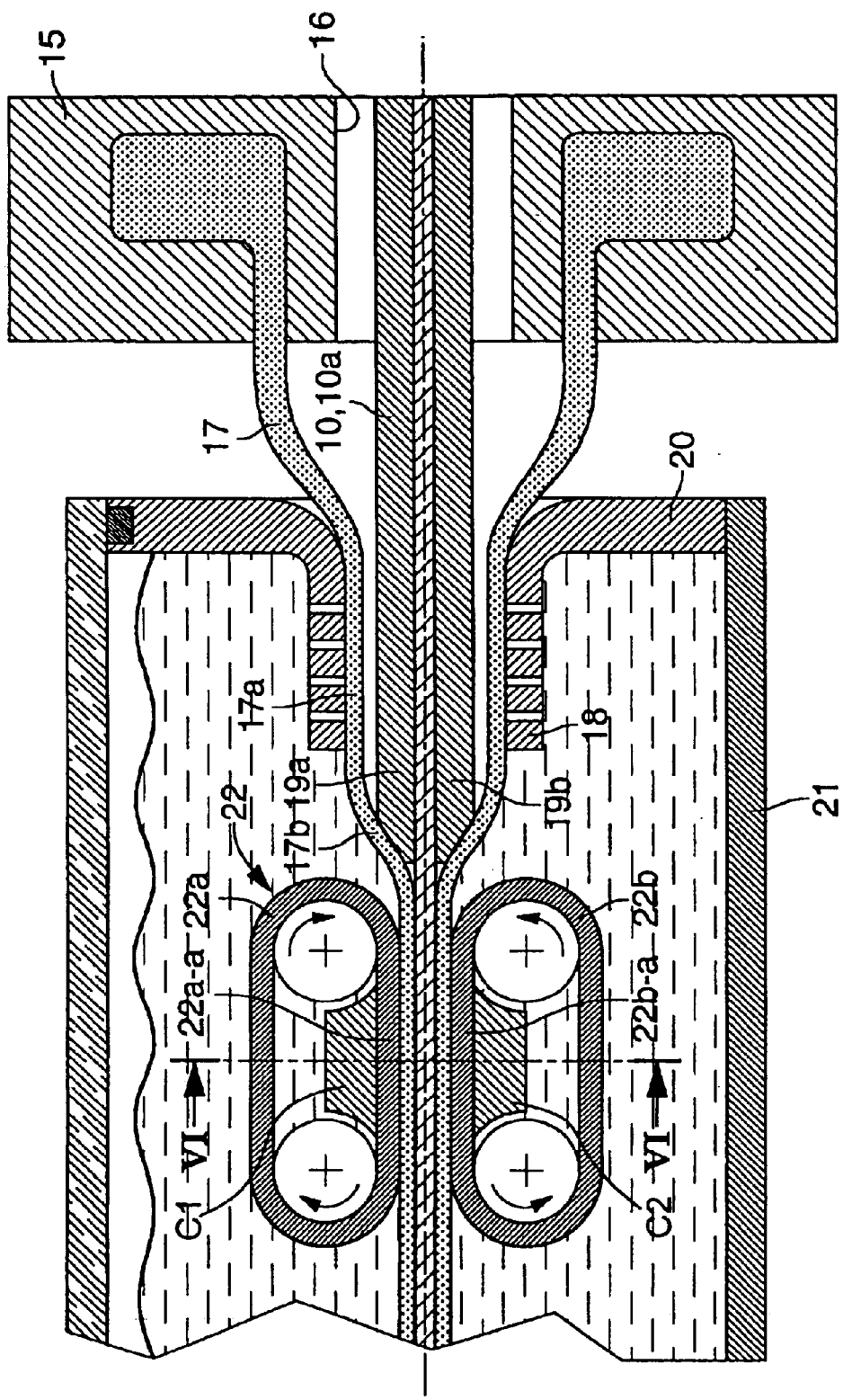
FIG. 5 shows a vertical and axial cross-section of a part of a manufacturing line of irrigation conduits according to the invention, the view showing, in particular, a die, a calibrator and a vacuum tank.

Reference will now be made to FIGS. 5 and 6 which illustrate several steps of the manufacturing method for intermediate product 6 which has just been described. The direction of progression of intermediate product 6 as it is formed is from right to left here.

FIG. 5 shows an extruder head 15 provided with a central aperture 16. This extruder head 15 can be of any known type. It allows the continuous extrusion of a sleeve tube blank 17, which is brought into the opening of a calibrator 18 where a tubular section 17a of sleeve tube 17 is formed, the diameter of which is brought to a calibrated value. This section 17a is shown in dotted lines in FIG. 6.

Two guides 19a and 19b, formed by elongated plates vertically spaced at a distance equal to that of a strip 10 or 10A (FIGS. 2 to 4), pass through extruder head 15 and calibrator 18. A strip 10 or 10A provided with its water flow cavities 11 or 11A, is continuously brought between guides 19a and 19b.

Calibrator 18 is placed in the upstream wall 20 of a cooling tank 21 which is sealed and kept in a vacuum. Tank 21 is filled with a cooling liquid such as water. Guides 19a and 29b slightly project from the downstream end of calibrator 18.

Still further downstream, cooling tank 21 contains pinching and bonding means 22, a cross-section of which can be seen in FIG. 6. These pinching and bonding means 22 are placed on the path of progression of product 6 being formed at a location where a section 17b of sleeve tube 17 is located, the temperature of which is sufficient to allow a positive heat bonding of sleeve tube 17 and strip 10 or 10A.

Pinching and bonding means 22 itself comprises two endless belts 22a, 22b whose width is slightly less than that of strip 10. They are arranged respectively above and below the path of progression of product 6 being formed, their adjacent strands 22a-a and 22b-a being spaced from each other at a distance which is slightly less than the sum of the width of strip 10 and twice the thickness of the sleeve tube in its calibrated section 17b. The wall of cooling tank 21 has two fixed brackets or shoes C1, C2, which extend horizontally towards the interior respectively between the upper and lower strands of endless belts 22a and 22b, it being clear that the lower strand of belt 22a is in contact with the lower face of bracket C1 and that the upper strand of belt 22b is in contact with the upper face of bracket C2.

The effect of pinching and bonding means 22 on sleeve 17 appears dearly in FIG. 6. The vertical diametral zone of sleeve tube 17a will be pinched and very quickly reduced in the transition field between the downstream end of guides 19a and 19b and the adjacent strands 22a-a and 22b-a of means 22, this operation giving rise to bands 8 and 9 shown in FIGS. 2 and 3, whereas the remaining part of sleeve 17a will take the shape of the two tubes 7a and 7b of two-part body 7. Simultaneously, since sleeve 17b is still hot enough, strip 10 will be bonded to bands 8 and 9.

Intermediate product 6 of FIGS. 2 and 3 is thus obtained at the outlet of means 22.

The set of operations of the manufacturing method according to the invention will now be briefly described with more particular reference to FIGS. 7A, 7B and 8A, 8B. The direction of progression of the process is from left to right in these Figures.

In a station 25, the plastic material is prepared in order to make a strip having the dimensions of a strip 10 or 10A. This material is fed into an extruder 26 including a die 27. The extruded strip 10 passes into a calibrator 27A then into a cooling station 28 to be brought into a dimension checking station 29, then into a pulling station 30. The manufacture of the strip is perfectly conventional and does not require any additional explanation.

Downstream of pulling station 30, there is arranged an accumulation station 31 in which the strip can form a sag 32 of variable depth. This accumulation station 31 is followed by a stamping station 33 responsible for making water flow cavities 11 or 11A in the strip, to form a strip like 10 or 10A.

This stamping station 33 preferably includes a fixed stamping die and a mobile punch whose shapes are suited to the impressions to be made in strip 10 or 10A. It will be noted that a stamping station of this type is known. During the stamping operation, the strip is stopped then accelerated until a following part of the strip to be stamped is at the stamping station and so on.

Downstream of stamping station 33, the manufacturing line includes a second accumulation station 34 in which the strip, now provided with its water flow cavities 11 or 11A, is brought to form a sag 35 of variable depth.

Accumulation stations 31 and 34 are provided with measuring means along the depth of the sags, which are formed therein, to be determined. The measuring data thereby collected is applied to pulling station 30 so that the latter adjusts the speed of the strip feeding stamping station 33 accordingly. This assembly thus compensates for the non-continuous working of the latter, the manufacturing process otherwise proceeding in a continuous manner.

According to a variant of the method, it is possible to replace stamping station 33, which has a fixed stamping die and mobile punch and operates inherently in a non-continuous manner, with a continuous stamping station 100, shown in FIGS. 9A, 10A and 9B, 10B. According to this variant, station 100 includes a rotating roller 102, at least one punch 104 with the desired water flow cavity shape embossed thereon, and a rotating roller 106 provided with at least one stamping die 108 for receiving the punch during the synchronised rotation of rollers 102 and 106. Strip 10 or 10A which continuously moves between the rollers, is thus cut at regular intervals by punch 104 in accordance with the configuration selected for flow cavities 11, the discarded portions 110 being recuperated inside roller shaped stamping die 106. Such a station has the advantage of operating continuously, which then makes accumulation stations 31 and 34 redundant. It will be noted that this variant also allows the water flow cavities to be cut in an extremely precise and well-defined manner provided the synchronisation of the rollers is properly adjusted.

Accumulation station 35 is followed by extruder head 15, calibrator 18 and vacuum tank 21, containing means 22 described hereinbefore with reference to FIGS. 5 and 6.

The intermediate product 6 obtained at the outlet of cooling tank 21 then passes into coolers 36 and 37, then into a pulling station 38, responsible for feeding the strip at the necessary speed.

This pulling station 38 is followed by a slitting station 39 in which a fixed knife, or preferably a rotating knife, allows intermediate product 6 to be slit longitudinally along plane of symmetry P (FIGS. 2 and 3).

Then, the two obtained conduits 1 are brought into a pulling station 40, separated from each other and respectively wound on take ups 41a and 41b.

The method, which has just been described, can be executed continuously at a constant speed of 60 m/min, for example, this value evidently being only indicative.

The irrigation conduit and its manufacturing method according to the invention thus has the following advantages:

- the labyrinth 12 or 12A can be of significant length, limited only by the distance between the outlet orifices 5 (FIG. 1). The risk of cavities 11 or 11A being clogged by dirt contained in the water is thus reduced since the flow sections can be large if the labyrinth is long;
- the stamping cutting operation allows very sharp edges to be obtained in the labyrinths. Consequently, the water flow becomes turbulent which reduces the flow rate sill further for a given section;
- the distance between the water flow cavities can easily be adjusted by carefully controlling the working rhythm of the stamping cutting station 33; and
- orifices 5 are obtained during the slitting of intermediate product 6, which avoids any perforation operation being made after manufacture.

Insofar as the manufacture passes via the intermediate product, the manufacturing line allows the quantity of conduits manufactured per unit of time to be doubled, which considerably reduces the cost price of the conduits.

Since strip 10 or 10A is continuously manufactured on the manufacturing line simultaneously with the manufacture of tubes 7a and 7b, it is not necessary to store independent dripper units, or to position the latter using a bowl feeder (for a description of individual dripper units of the prior art, see the European Patent Application filed in the name of the Applicant under the No. 98112645.1 on 8 Jul. 1998).

The dimensions of tube 1 can be small. By way of indication, its diameter can be between 12 and 25 mm and the thickness of its wall can be between 0.15 and 1.2 mm.

What is claimed is:

1. Method for simultaneously manufacturing at least two irrigation conduits including the steps consisting in:
    a) continuously producing at least one strip made of plastic material (10, 10A),
    b) cutting out, by stamping, in said strip (10, 10A) through flow cavities (11, 11A), juxtaposed substantially on either side of a longitudinal plane of symmetry (P) of the strip (10, 10A) each flow cavity (11, 11A) including at a first end a feed chamber (13) intended to open out into one of two juxtaposed conduits (7a, 7b) and at another end a discharge chamber (14) intended to open out on the exterior of said one conduit, the stamping step being also provided so that the discharge chambers of the flow cavities extend substantially on either side of the plane of symmetry (P) of the strip and do not communicate with each other,
    c) continuously producing a tubular sleeve (17) made of plastic material intended to form said conduits,
    d) guiding said strip (10,10A) axially inside said sleeve (17) during its production,
    e) pinching said sleeve in at least a diametral zone to form an elongated two-part body (7) exhibiting symmetry with respect to said longitudinal plane (P) and including the two juxtaposed conduits (7a, 7b), joined by superposed bands (8, 9) integral with said sleeve, said strip (10, 10A) being secured in an impervious manner between the bands (8, 9),
    f) bonding said strip (10, 10A) to said bands (8, 9), and
    g) slitting said two-part body longitudinally along said plane of symmetry (P).

2. Manufacturing method according to claim 1, wherein the tubular sleeve has shaping heat, said pinching and bonding operations are merged and executed while the sleeve (17) still has its shaping heat.

3. Manufacturing method according to claim 1, characterised in that said stamping step is executed in a non-continuous manner and in that it also consists in accumulating a length of said strip (10,10A) before and/or after said stamping step, the quantity of accumulated strip being adjusted as a function of the speed of execution of said stamping step.

4. Manufacturing method according to claim 1, characterised in that said cavities (11) are cut into said strip (10) alternately, on either side of said longitudinal plane of symmetry (P).

5. Manufacturing method according to claim 1, characterised in that said cavities (11A) are cut into said strip (10A) in lateral juxtaposition on either side of said plane of symmetry (P).

6. Manufacturing method according to claim 1, characterised in that the discharge chamber (14) of each of said cavities (11, 11A) is cut so as to pass beyond said longitudinal plane of symmetry (P) by a volume (14a) which can be divided.

7. Manufacturing method according to claim 1, characterised in that each flow cavity includes a labyrinth (12) arranged longitudinally in said strip and extending between said feed chamber and said discharge chamber.

8. Manufacturing method according to claim 7, characterised in that each labyrinth has a plurality of juxtaposed V-shaped meanders (12a).

9. Manufacturing method according to claim 7, characterised in that each labyrinth (12A) has a plurality of juxtaposed zigzag meanders (12A-a).

10. Manufacturing method according to claim 1,
    wherein, after completion of step (g), two tubes (1) are obtained, each of said tubes being provided laterally with superposed longitudinal lips having longitudinal edges,
    wherein a portion of said strip (10) is interposed between said lips, and
    wherein said strip portion is flush externally with said edges of said lips (3a, 3b) and internally projects inside a tube (2) by forming an edge (4a).

11. Manufacturing method according to claim 1, characterised in that said stamping step is executed continuously in a continuous stamping station.

12. Manufacturing method according to claim 11, characterised in that the continuous stamping station includes a rotating roller (102) provided with at least one punch (104)

embossed with the desired water flow cavity shape, and a rotating roller (106) provided with at least one stamping die (108) for receiving the punch during synchronised rotation of the rollers (102, 106).

13. Intermediate product obtained in accordance with steps a) to f) of claim 1, characterised in that it includes an elongated two-part body (7) exhibiting symmetry with respect to a longitudinal plane (P) and including two juxtaposed conduits (7a, 7b) joined by superposed bands (8, 9) integral with said sleeve, and a strip (10,10A) secured in an impervious manner between the bands (8, 9), in that said strip is provided with through flow cavities, substantially on either side of said longitudinal plane of symmetry (P) of the strip (10, 10A), each flow cavity (11, 11A) including at a first end, a feed chamber (13) opening out into one of said conduits (7a, 7b), and, at another end, a discharge chamber (14) intended to open out on the exterior of said one conduit and in that the discharge chambers of the flow cavities extend substantially on either side of the plane of symmetry (P) of the strip and do not communicate with each other.

* * * * *